(12) United States Patent
Papazian

(10) Patent No.: US 11,173,021 B2
(45) Date of Patent: Nov. 16, 2021

(54) REPLACEMENT HEAD ASSEMBLY FOR TOOTHBRUSHING SYSTEMS

(71) Applicant: Mihran Papazian, Granada Hills, CA (US)

(72) Inventor: Mihran Papazian, Granada Hills, CA (US)

( * ) Notice: Subject to any disclaimer, the term of this patent is extended or adjusted under 35 U.S.C. 154(b) by 53 days.

(21) Appl. No.: 16/301,720

(22) PCT Filed: Nov. 2, 2017

(86) PCT No.: PCT/US2017/059639
§ 371 (c)(1),
(2) Date: Nov. 14, 2018

(87) PCT Pub. No.: WO2018/085484
PCT Pub. Date: May 11, 2018

(65) Prior Publication Data
US 2020/0315758 A1    Oct. 8, 2020

Related U.S. Application Data

(60) Provisional application No. 62/417,220, filed on Nov. 3, 2017, provisional application No. 62/477,957, filed on Mar. 28, 2017.

(51) Int. Cl.
*A61C 17/22*    (2006.01)
*A46B 9/04*    (2006.01)
(Continued)

(52) U.S. Cl.
CPC .............. *A61C 17/222* (2013.01); *A46B 9/04* (2013.01); *A46B 5/0095* (2013.01);
(Continued)

(58) Field of Classification Search
CPC ..... A61C 17/222; A61C 17/3436; A46B 9/04; A46B 5/0095; A46B 2200/1066
See application file for complete search history.

(56) References Cited

U.S. PATENT DOCUMENTS 2,677,842 A  *  5/1954  Sherwin .............. A46B 11/001
                                                    15/210.1
4,106,152 A     8/1978  Hadary
                    (Continued)

FOREIGN PATENT DOCUMENTS

CN            2636839        9/2004
CN          105581501        5/2016
                    (Continued)

OTHER PUBLICATIONS

International Search Report and Written Opinion for International Application No. PCT/US2017/059639 dated Jan. 22, 2018.

*Primary Examiner* — Shay Karls

(57) ABSTRACT

A replacement toothbrush head assembly is provided for an electric toothbrush. The replacement toothbrush head assembly is provided in the form of an assembly that includes a head portion and a stem portion, such that the head portion may be selectively and easily attached and detached from the stem portion. The head includes a plurality of bristles extending from a main body having a coupling portion. The stem includes a corresponding locking portion configured to receive the coupling portion, such that the head is releasably coupled to the stem in an assembled condition.

14 Claims, 13 Drawing Sheets

(51) Int. Cl.
  *A46B 5/00* (2006.01)
  *A61C 17/34* (2006.01)
  *B29L 31/42* (2006.01)

(52) U.S. Cl.
  CPC ... *A46B 2200/1066* (2013.01); *A61C 17/3436* (2013.01); *B29L 2031/425* (2013.01)

(56) References Cited

U.S. PATENT DOCUMENTS

| | | | |
|---|---|---|---|
| 5,732,432 | A | 3/1998 | Hui |
| 5,768,737 | A | 6/1998 | Johnson |
| 5,884,354 | A | 3/1999 | Anderson |
| 6,148,462 | A | 11/2000 | Zseng |
| 6,195,828 | B1 | 3/2001 | Fritsch |
| 6,574,820 | B1 * | 6/2003 | DePuydt ............... A61C 15/047 15/22.1 |
| 7,266,855 | B2 | 9/2007 | Zhuan |
| 7,398,575 | B2 | 7/2008 | Chan |
| 7,409,741 | B2 | 8/2008 | Dworzan |
| 7,698,771 | B2 | 4/2010 | Gall |
| 8,011,057 | B2 | 9/2011 | Nejat |
| 8,032,967 | B2 | 10/2011 | Jimenez |
| 8,096,011 | B2 | 1/2012 | Chan |
| 8,166,601 | B2 | 5/2012 | Brown, Jr. et al. |
| 8,234,742 | B2 | 8/2012 | Blaustein et al. |
| 8,266,753 | B2 | 9/2012 | Wood et al. |
| 8,307,488 | B2 | 11/2012 | Pfenniger |
| 8,434,183 | B2 | 5/2013 | Fritsch et al. |
| 8,533,886 | B2 | 9/2013 | Cobabe et al. |
| 8,769,754 | B2 | 7/2014 | Byeon |
| 8,782,841 | B2 * | 7/2014 | Sale ....................... A61C 17/34 15/22.1 |
| 8,800,093 | B2 | 8/2014 | Moskovich et al. |
| 8,955,185 | B2 | 2/2015 | Huy |
| 9,015,886 | B2 | 4/2015 | Fritsch |
| 9,237,943 | B2 | 1/2016 | Graeve |
| 9,387,059 | B2 | 7/2016 | Utsch et al. |
| 9,561,092 | B2 | 2/2017 | Sauer et al. |
| 9,572,642 | B2 | 2/2017 | Fischer et al. |
| 9,724,180 | B1 | 8/2017 | Liu |
| 2004/0010872 | A1 * | 1/2004 | Chiang .................. A61C 17/34 15/28 |
| 2004/0255418 | A1 * | 12/2004 | Minkler ................ A47K 11/10 15/210.1 |
| 2008/0172812 | A1 | 7/2008 | Dean |
| 2012/0237888 | A1 * | 9/2012 | McWhorter ....... A46B 15/0055 433/29 |
| 2013/0061412 | A1 | 3/2013 | Vashi |

FOREIGN PATENT DOCUMENTS

| | | |
|---|---|---|
| FR | 649074 | 12/1928 |
| WO | 2006004316 A1 | 1/2006 |

* cited by examiner

REPLACEMENT HEAD ASSEMBLY FOR TOOTHBRUSHING SYSTEMS

CROSS REFERENCE TO RELATED APPLICATIONS

This application is the U.S. national application of International Application PCT/US2017/059639, filed on Nov. 2, 2017, which claims the benefit of and priority to U.S. Provisional Application having Ser. No. 62/417,220, filed Nov. 3, 2016, and U.S. Provisional Application having Ser. No. 62/477,957, filed Mar. 28, 2017, the contents of which are incorporated herein in their entireties.

FIELD OF THE INVENTION

The field of the invention relates to tooth brushing systems, specifically brush head assemblies for electric toothbrushes.

BACKGROUND OF THE INVENTION

Electric toothbrushes offer several known advantages with respect to maintaining good dental hygiene. Several electric toothbrush systems are presently available and these systems generally include a replaceable head that is attached to a main body that houses the electro-mechanical and power components. The head is typically a single disposable piece having a neck and bristle portion.

Present systems include several drawbacks. For example, replaceable heads are relatively expensive. This provides a disincentive for users to replace the head as frequently as necessary to discard used brush heads that may have excessive bacteria growth. Furthermore, when a user must replace the head due to worn bristles or if the user desires a softer or harder bristle, the entire head must be discarded resulting in excessive waste.

Thus, there is a need for improved heads for electric tooth brushing systems.

SUMMARY OF THE INVENTION

It is an aspect of the various embodiments of the present invention to provide a replacement toothbrush head assembly. The assembly may comprise a head portion and a stem portion, such that the head portion may be selectively and easily attached and detached from the stem portion. The head may comprise a plurality of bristles extending from a main body having a coupling portion. The stem may include a corresponding locking portion configured to receive the coupling portion, such that the head is releasably coupled to the stem in an assembled condition.

These and other aspects of the present invention will be apparent in view of the following description.

BRIEF DESCRIPTION OF THE DRAWINGS

The drawing Figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention provide a replacement toothbrush head assembly for an electric toothbrush, such that the head is releasably coupled to the stem in an assembled condition. As used herein throughout the specification and the claims, a "toothbrush head assembly" means the removable portion of an electric toothbrush that is inserted into the user's mouth, and excludes the handle portion containing the motor. As used herein throughout the specification and the claims, "releasably coupled" means that the head portion containing the bristles of the toothbrush assembly may be repeatedly attached and separated from the stem portion of the toothbrush assembly without destroying the toothbrush assembly. Therefore, various embodiments of the present invention provide an assembly in which only the brush portion requires periodic replacement and disposal while the stem portion of the brush head may be re-used.

Figure 1:
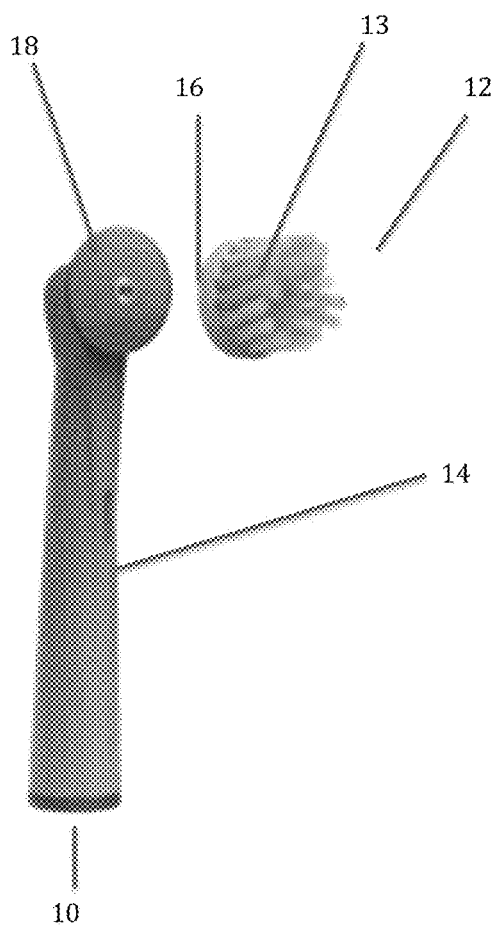
FIG. 1 is a front elevational view of a head and stem of an assembly according to a first embodiment of the present invention.
Figure 2A:
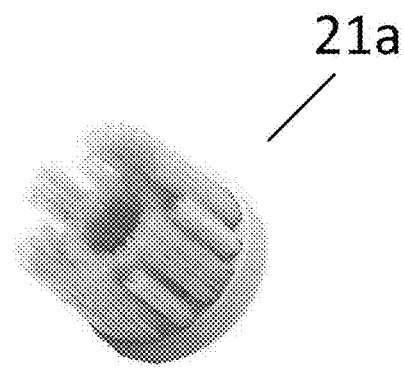
FIGS. 2A to 2D are top elevational views of various configurations of a head portion for an assembly according to various embodiments of the present invention.
Figure 2B:
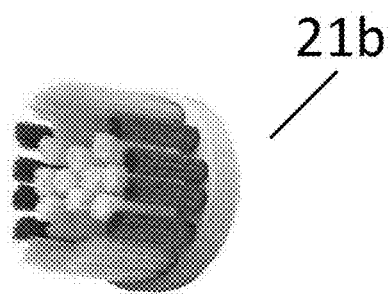
Figure 2C:
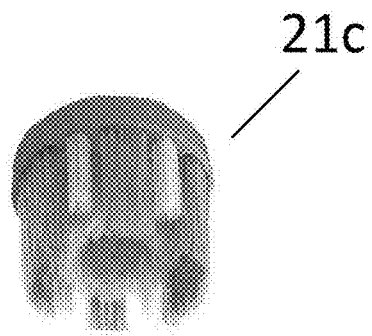
Figure 2D:
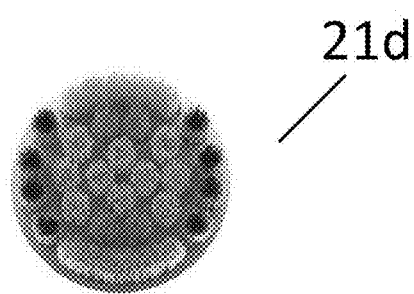

Referring now to FIG. 1, a first embodiment of the present invention is illustrated. The replacement head assembly 10 may comprise at least two separable parts, a head 12 and a stem 14. The head 12 may include a plurality of bristles 13 extending from a main body 16. The main body 16 of the head 12 may also include a locking portion or device. The stem 14 may include a corresponding coupling portion 18 to receive the locking device of the head 12, so that the head 12 may be attached to the stem 14. In some embodiments of the present invention, the coupling portion and locking portion may be configured, such that the head is in a fixed position relative to the stem in an assembled condition. In other embodiments, the coupling portion and locking portion may be configured such that the head is movably attached to the stem in the assembled condition.

For example, in one embodiment, the locking portion or device of the head portion may include threading around the perimeter of the main body of the head and the coupling portion may include a biased and resilient detent and corresponding threads for the head portion, such that the detent must be depressed before aligning the threads of the head and stem to screw the head onto the stem, similar to a ratchet system. Upon screwing the head onto the stem and allowing the detent to relax to the biased position, the detent would prevent the head from being removed from the stem. In order to separate the head from the stem for disposal, the resilient detent may again be depressed to allow rotation of the head in the opposite direction.

In another embodiment, the locking portion or device may include threading around the perimeter of the main body of the head, for example. The coupling portion on the stem of the assembly may include a two part system, similar to a child resistant cap in which a resilient spring biases corresponding threads for the head away from a set of teeth, such that the threading on the head and stem must be depressed to engage the teeth in order to screw the head on and off.

Figure 4A:
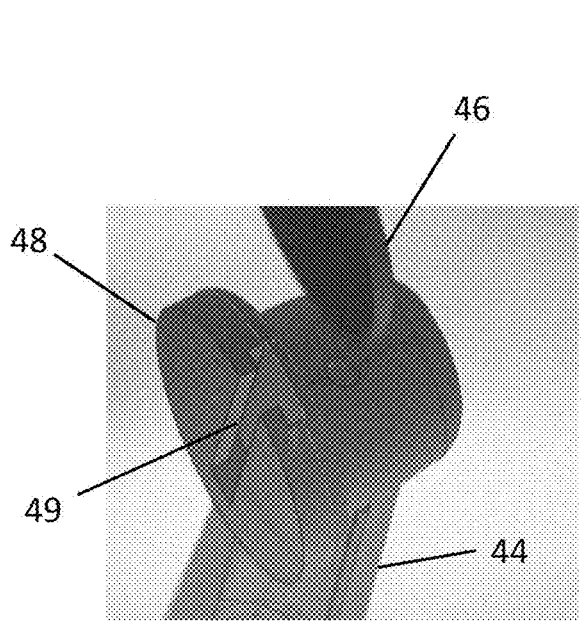
FIGS. 4A to 4D are magnified top elevational views of a coupling portion of a head and locking portion of a stem according to a third embodiment of the present invention.
Figure 4B:
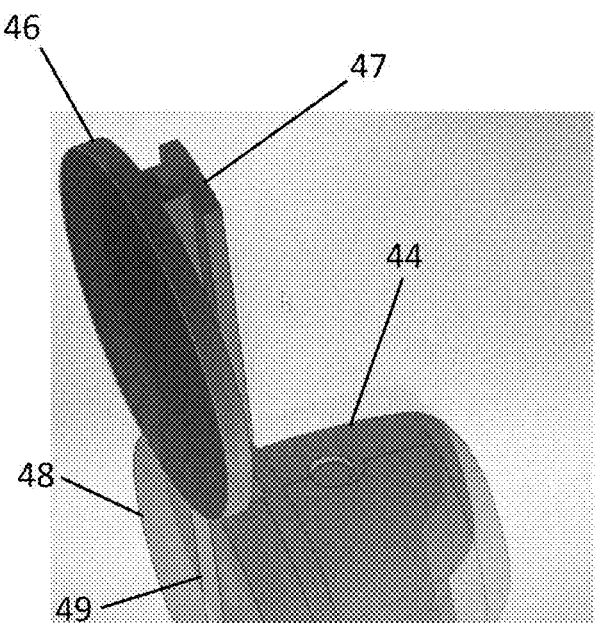
Figure 4C:
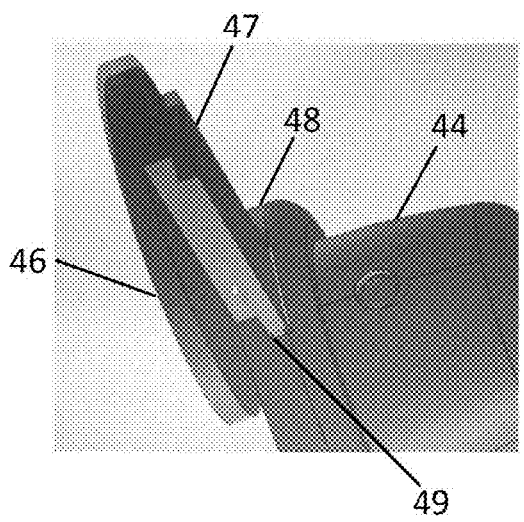
Figure 4D:
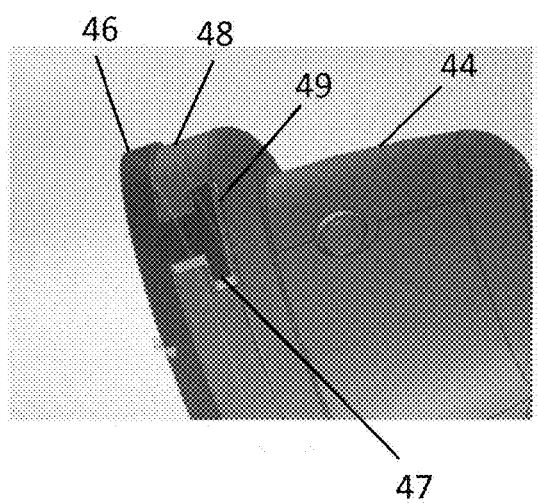

Other examples of locking devices include a pressure button system, a press-fit system, an encasing of the head on the stem, and a sliding system. For example another embodiment of a locking device is provided for a two-part toothbrush head assembly illustrated in FIGS. 4A to 4D. In FIG. 4A the coupling portion of the stem 44 may be provided in the form of a slot 49. The shape of the slot 49 may be T-shaped; however, any shape that may prevent the head from being pulled away from the stem in the assembled condition may be used. As best seen in FIGS. 4B, 4C, and 4D, a sliding rail 47 having a similar shape as the slot 49 may be provided on a surface of the main body 46 of the head.

The sliding rail 47 preferably extends from a surface of the main body 46 that is an opposing surface relative to the surface from which the bristles extend. The head in FIGS. 4A to 4D is illustrated without bristles. The sliding rail 47 may have dimensions that are slightly larger than the slot 49 in order to provide a frictional fit upon sliding the body 46 of the head onto the stem 44 to a locked position, as illustrated in FIG. 4D. For example, the sliding rail 47 may be tapered and the width of the slot 49 may be equal to a dimension between the narrowest and widest portion of the tapered sliding rail. Alternatively, the slot 49 may be tapered and the sides of the sliding rail 47 may be parallel.

As would be appreciated by those of skill in the art, the locking portion of the head and coupling portion of the stem may be reversed, such that the stem is provided with the locking portion and the head is provided with the coupling portion.

Figure 5:
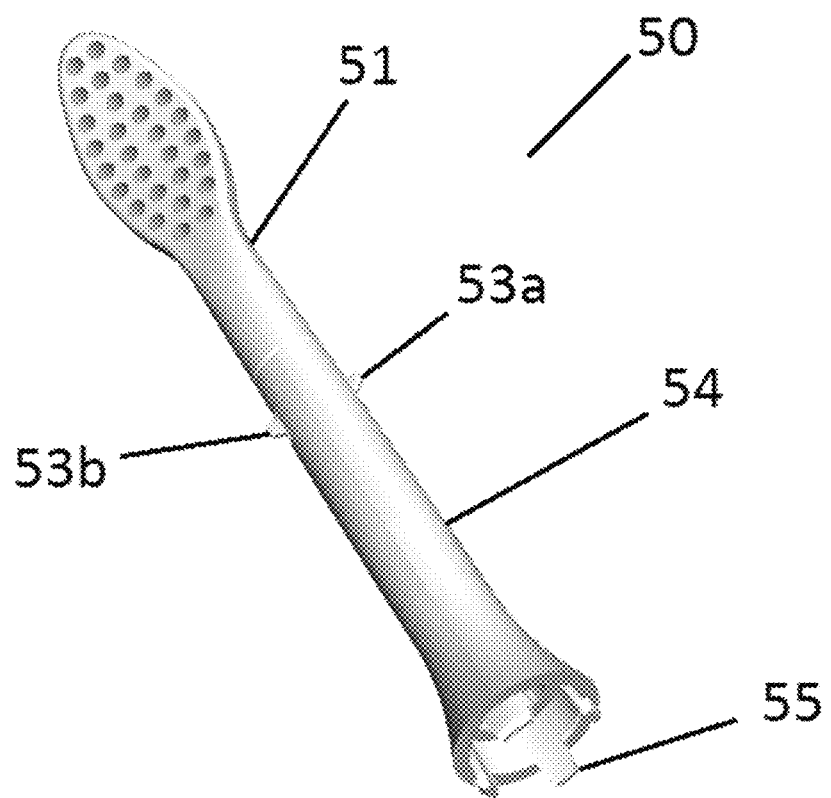
FIG. 5 is a front elevational view of a head and stem of an assembly according to a fourth embodiment of the present invention.

Referring now to FIG. 5, a two-part assembly according to another embodiment of the present invention is illustrated. The two-part assembly 50 may comprise a head portion 51 and stem portion 54. The stem portion 54 may include a plurality of connectors 55 at the base of the stem 54 for attaching the assembly to an electric toothbrush (not shown). The opposite end of the stem 54 may be open to receive the head portion 51 of the assembly 50. The head portion 51 illustrated without bristles may be releasably attached to an end of the stem 54 by using one or more resilient detents 53a, 53b, for example. The detents 53a, 53b may be provided with an angled leading surface, such that when the head 51 is inserted into the open end of the stem 54, the detents 53a, 53b are deflected. However, when the detents 53, 53b reach corresponding holes in the wall of the stem 54, the detents 53a, 53b relax and capture the head 51 onto the stem 54. In order to release the head 51 from the stem 54, the detents 53a, 53b are depressed while simultaneously pulling the head 51 away from the stem 54.

The previously described embodiments in FIGS. 4A to 4D and FIG. 5 provide assemblies in which the position of the head portion of the assembly remains relatively fixed relative to the stem portion. The assemblies may therefore be used with sonicating electric toothbrushes.

Figure 6:
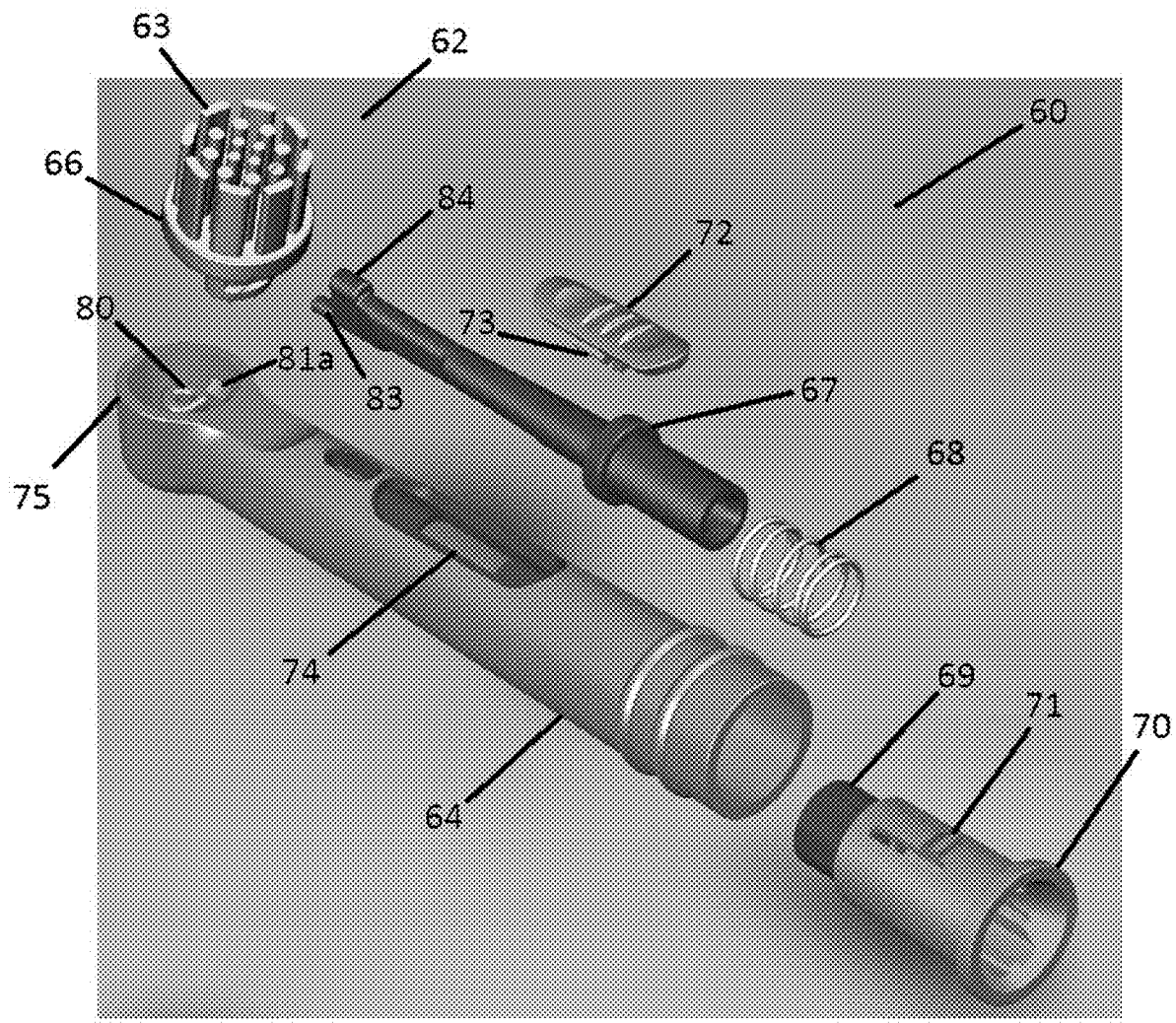
FIG. 6 is an exploded view of an assembly according to a fifth embodiment of the present invention.
Figure 7A:
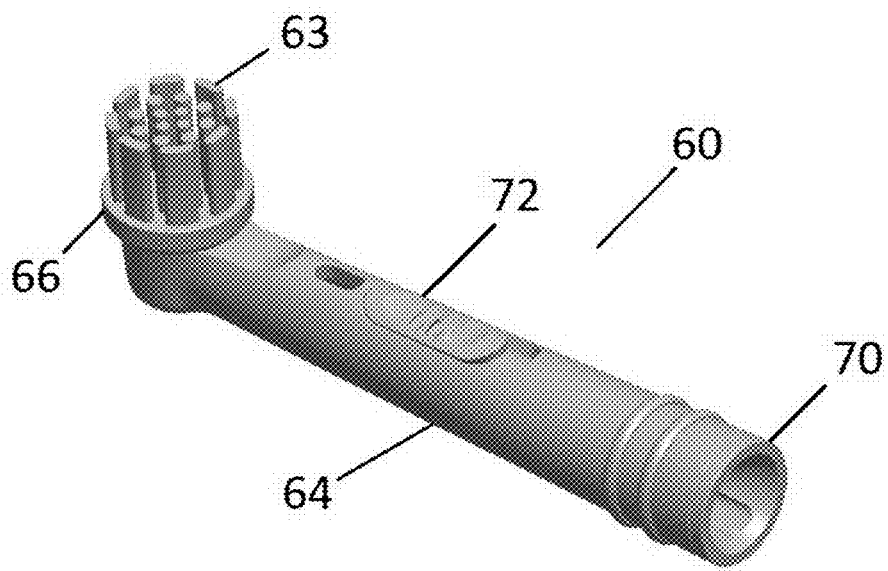
FIGS. 7A and 7B are top elevational views of the embodiment of FIG. 6 in an assembled condition.
Figure 7B:
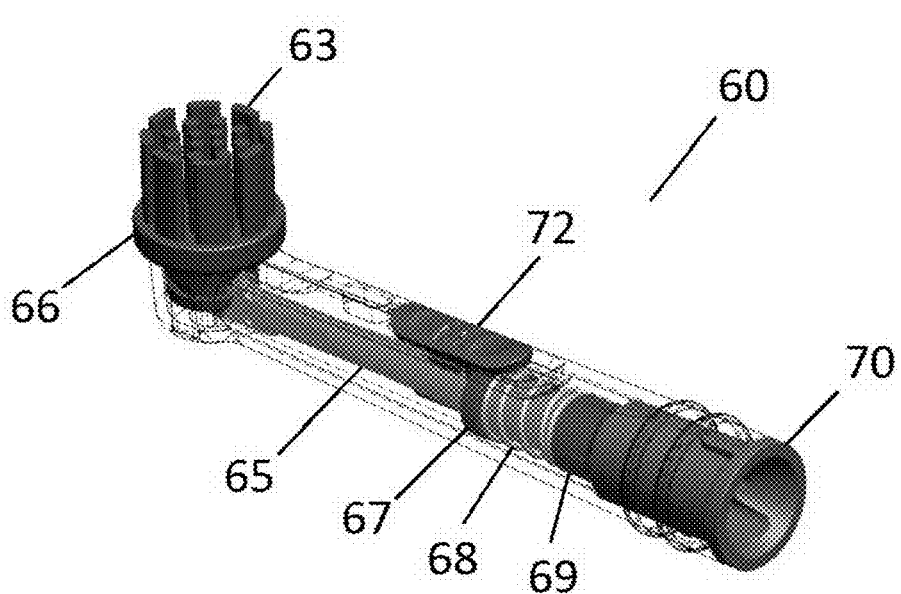

Referring now to FIGS. 6 to 12, an assembly according to another embodiment of the present invention is illustrated that may be used with an oscillating type of electric toothbrush. In FIGS. 6, 7A, and 7B, an assembly 60 comprises a head 62 and a multipart stem. The stem may comprise a housing 64 in which a shaft 65 may be inserted. Prior to inserting the shaft 65 into the housing 64, the rear end of the shaft 65 is first inserted through the center of a coil spring 68 before sliding the rear end of the shaft 65 into the front portion 69 of an end cap 70. One end of the coil spring 68 bears against a seat 67 of the shaft 65 while the opposite end of the coil spring 68 bears against the front portion 69 of the end cap 70. The shaft 65 and the front portion 69 of the end cap 70 are configured such that the shaft 65 may longitudinally slide relative to the front portion 69. The end cap 70 may include a resilient tab 71 that will lock the end cap 70 in place after insertion into the housing 64.

Figure 10A:
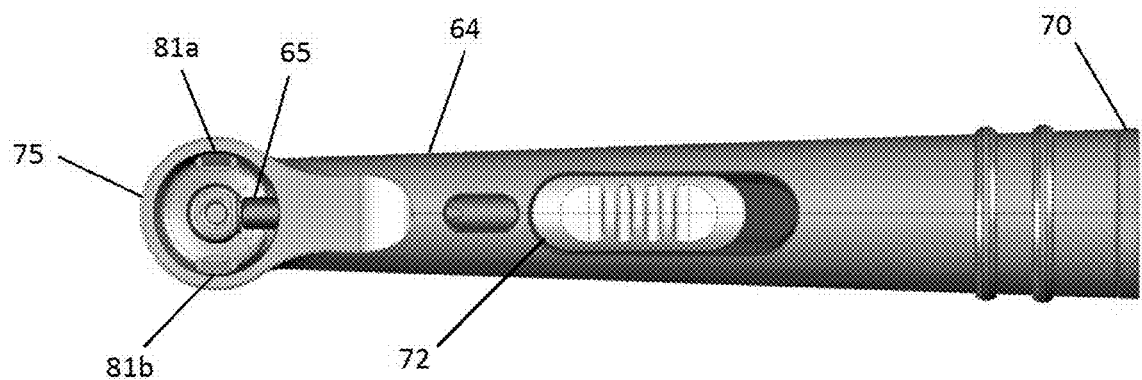
FIGS. 10A and 10B are top plan views of the stem of the embodiment of FIG. 6.
Figure 10B:
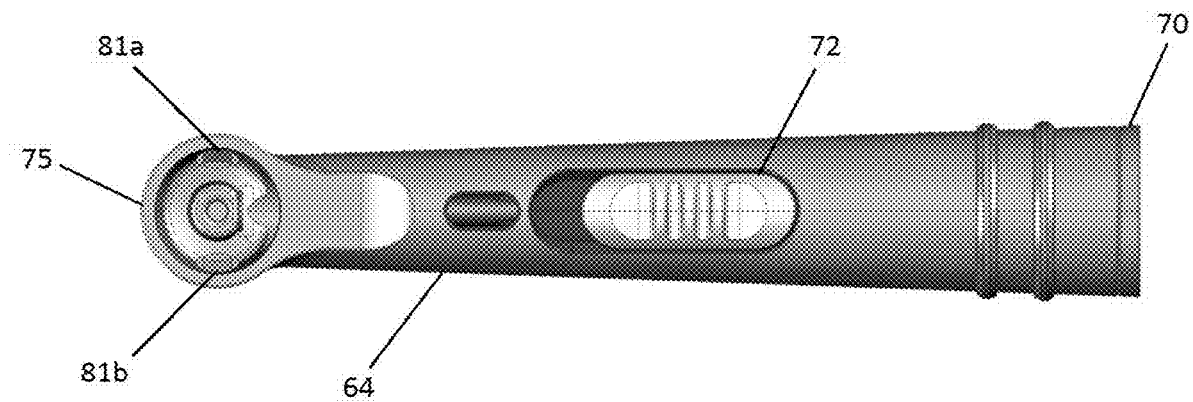

The shaft assembly may further comprise a sliding button 72. The button 72 may include one or more tabs 73 extending from a bottom surface of the button 72. Similar to the end cap 70, one or more of the tabs 73 may be resilient, such that when the resilient tabs 73 are inserted into an aperture 74 in the housing 64, the button 72 is captured, i.e. the button 72 is not separable from the housing 64. One or more of the tabs 73 may also impinge on the seat 67 of the shaft 65, such that sliding the button 72 towards the end cap 70 will slide the shaft 65 in the same direction and compress the spring 68, as illustrated in FIG. 10B. Releasing the button 72 will allow the spring 68 to return to a relaxed condition and bias the shaft 65 in a direction away from the end cap 70, as illustrated in FIG. 10A.

Figure 8A:
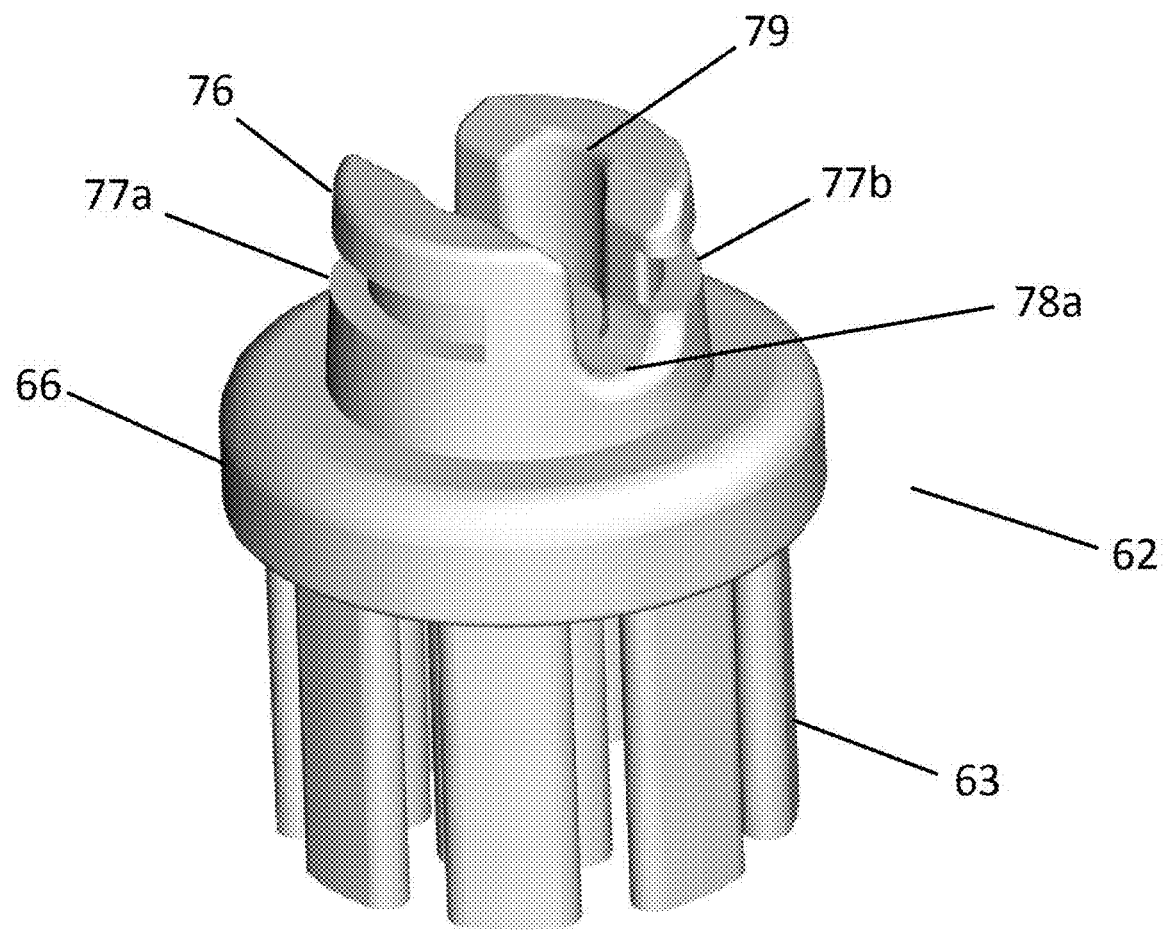
FIG. 8A is a top elevational view of a head of the embodiment of FIG. 6.
Figure 8B:
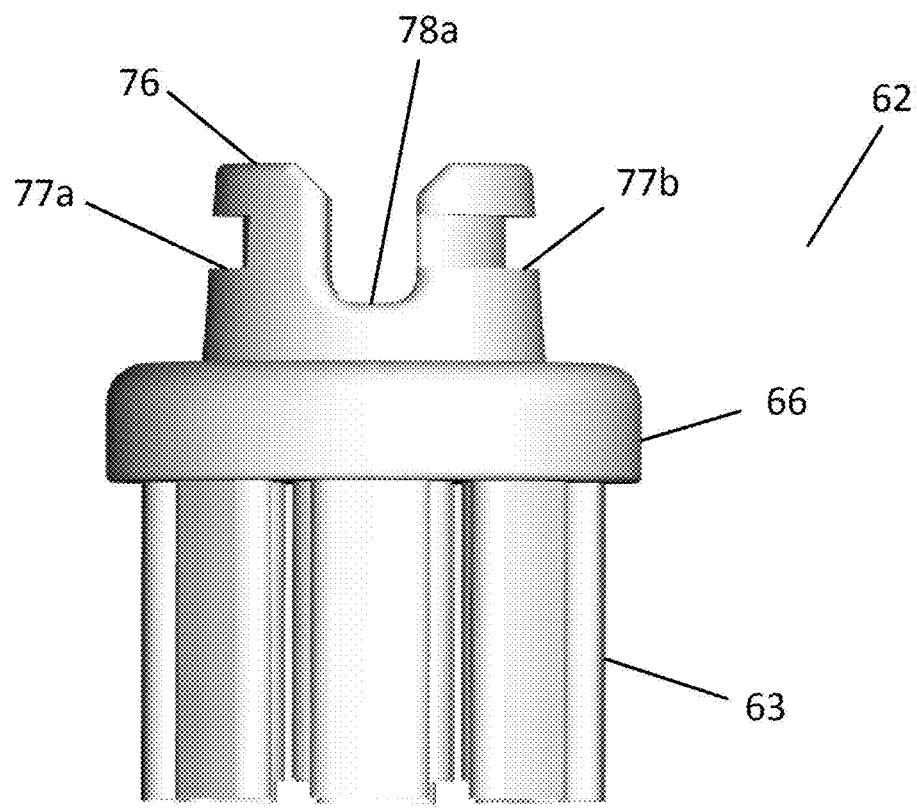
FIG. 8B is a front view of the head of FIG. 8B.

The opposing end of the housing 64 relative to the end cap 70 may also include a receptacle 75 that is configured to receive the locking portion of the head 62. Referring to FIGS. 8A and 8B, the head 62 includes a main body 66. A plurality of bristles 63 extend from a front surface of the main body 66 and a locking portion 76 extends from a rear surface of the main body 66. The locking portion 76 includes at least one, preferably two, circumferential grooves 77a, 77b for receiving corresponding retaining tabs 81a, 81b that protrude from an inner wall of the receptacle 75. The two grooves 77a, 77b are separated by two gaps, 78a, 78b. The locking portion 76 further includes a female portion 79 for receiving a pivot peg 80 within the receptacle 75 of the shaft housing 64.

Figure 9:
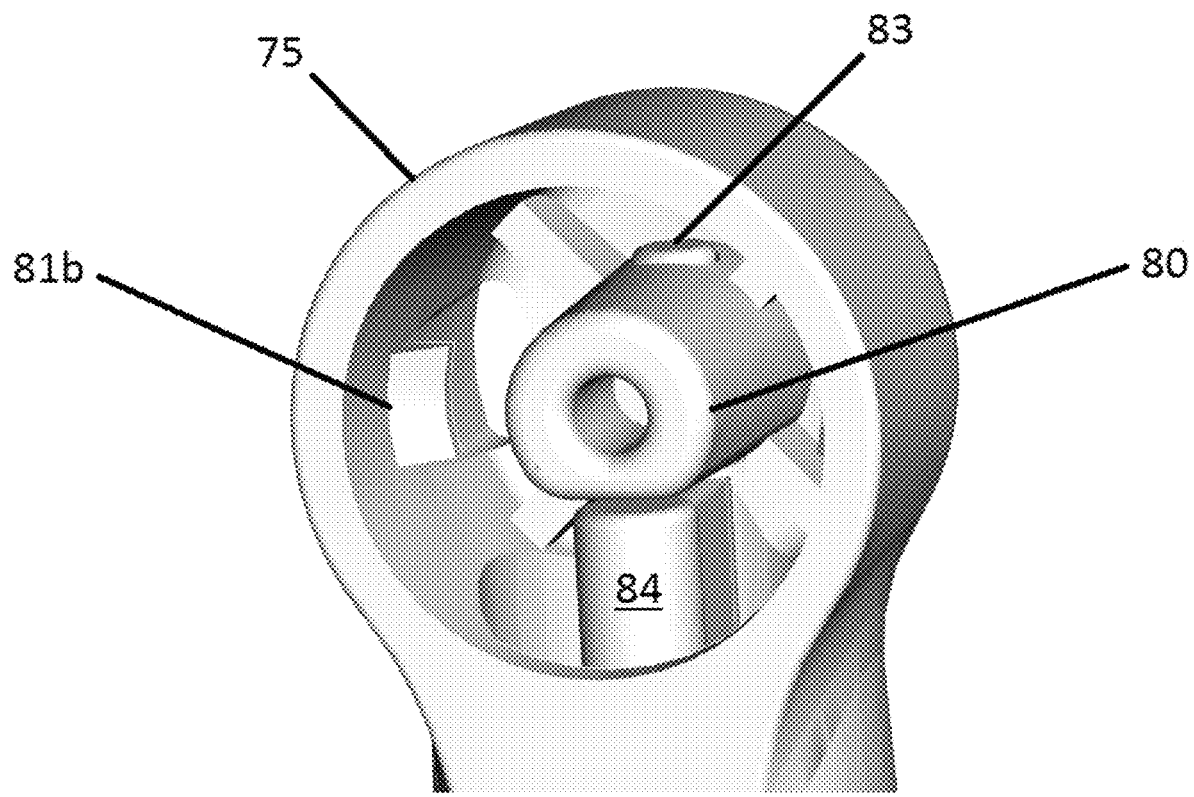
FIG. 9 is a magnified view of a receptacle of the stem of the embodiment of FIG. 6.
Figure 11A:
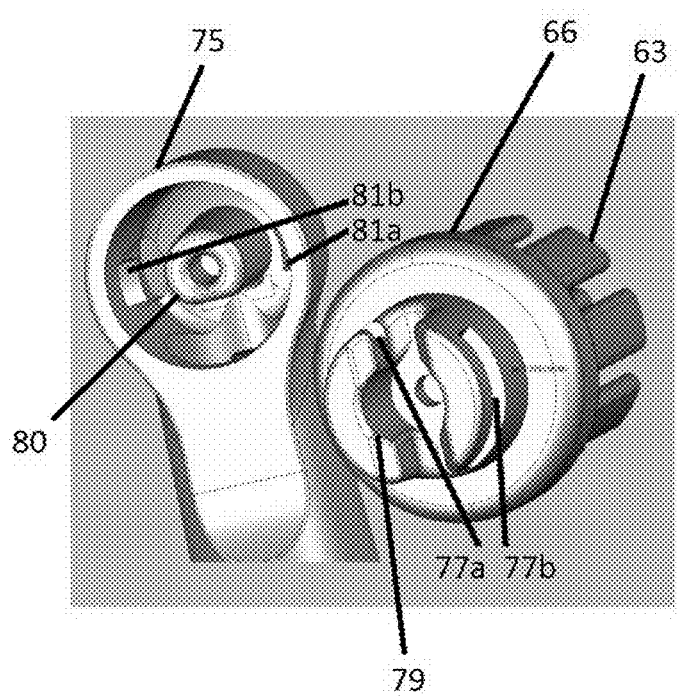
FIGS. 11A and 11B are magnified views of the head and stem receptacle of the embodiment of FIG. 6.
Figure 11B:
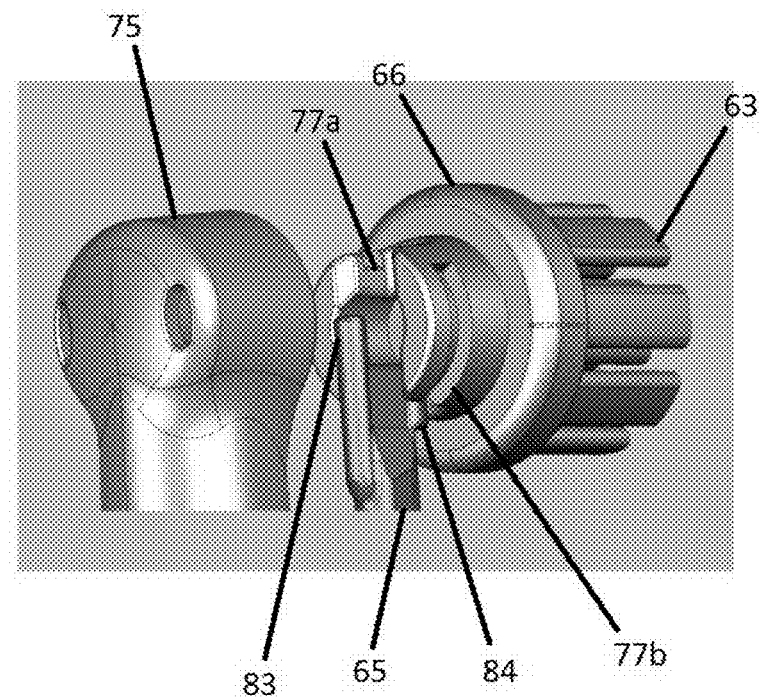
Figure 12:
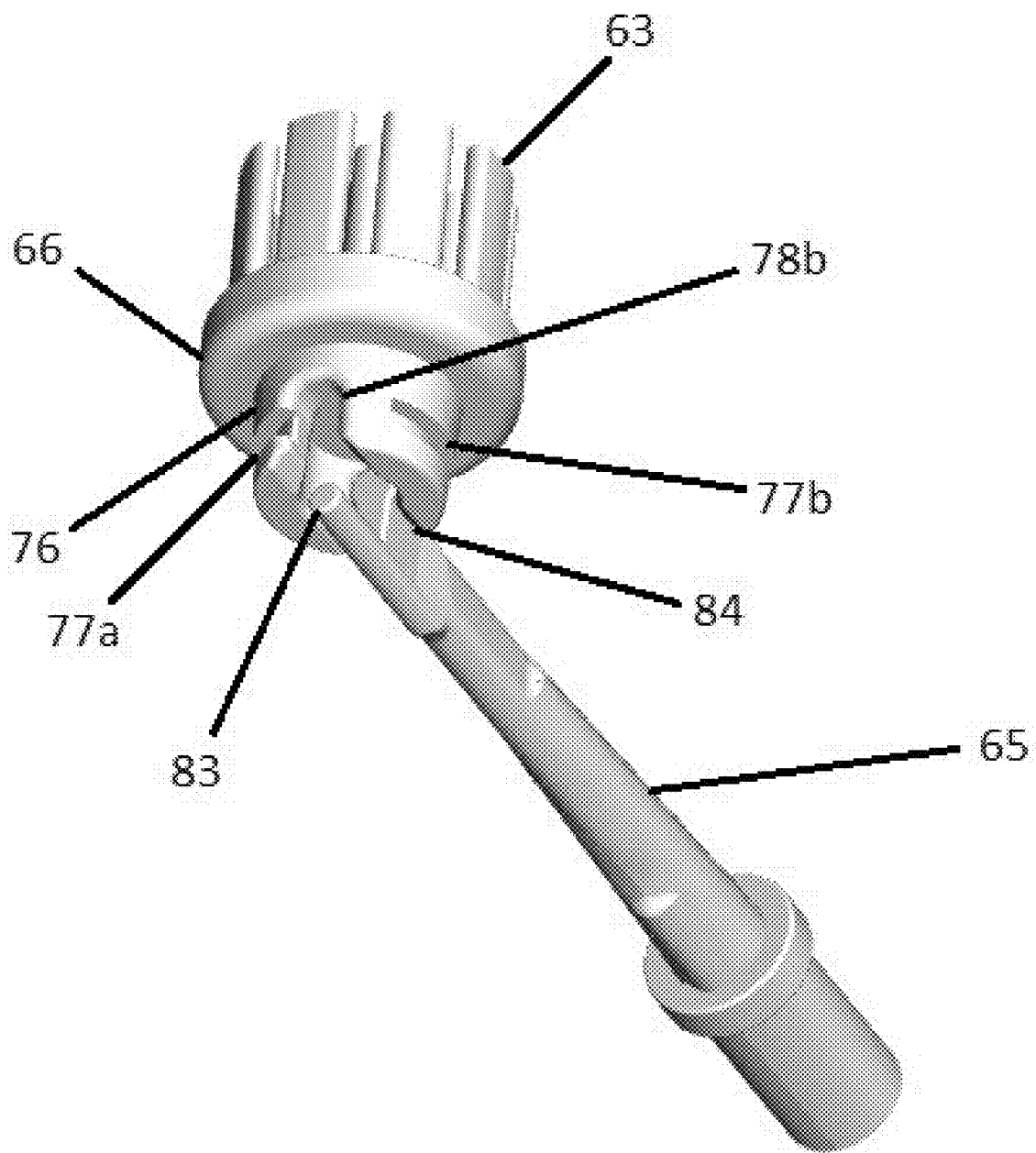
FIG. 12 is a bottom elevational view of a head and shaft of the embodiment of FIG. 6.

Referring now to FIGS. 9, 11A, and 11B, the pivot peg 80 extends vertically from the floor of the receptacle 75. When the shaft 65 is inserted into the housing 64, a tip 83 of the shaft 65 occupies a hole in the base of the pivot peg 80 and a paddle portion 84 of the shaft 65 extends in a direction perpendicular to the tip 83 that is substantially parallel to the pivot peg 80. To insert the locking portion 76 of the head 62 into the receptacle 75, one of the gaps 78a, 78b may register with the paddle portion 84. Once aligned, the locking portion 76 may be pressed into the receptacle 75, such that the pivot peg 80 mates with the female portion 79 of the locking portion 76. Alternatively, alignment of the gaps 78a, 78b with the paddle 84 may be unnecessary. Instead, a user may simply press the locking portion 76 into the receptacle 75, which forces the shaft 65 to retract against the coil spring 68. A user may then rotate the head 62 in a clockwise direction, for example, until one of the gaps 78a, 78b is aligned with the paddle 84 allowing the spring 68 to relax and bias the shaft 65, such that the paddle 84 extends into the gaps 78a, 78b.

The retaining tabs 81a, 81b are preferably provided with inclined surfaces, so that the tabs 81a, 81b will slide into the circumferential grooves 77a, 77b when the locking portion 76 is pressed onto the pivot peg 80. The height of the pivot peg 80 may be selected to limit the penetration depth of the head 62 when it is inserted into the receptacle 75 to ensure that the height of the grooves 77a, 77b will be approximately equal to the height of the tabs 81a, 81b once installed. When the tabs 81a, 81b occupy the grooves 77a, 77b, the head 62 is now movably retained to the shaft.

Operation of the toothbrush head assembly may be accomplished by joining the assembly with the motor of an electric toothbrush. Mechanical motion from the motor is imparted onto the shaft 65, such that the shaft rotationally oscillates about a longitudinal axis that passes through the tip 83. As the tip 83 rotates back and forth, the paddle 84 also swings. As the paddle 84 oscillates, the paddle 84 impinges on the sides of the gap 78a, 78b in the locking portion 76 of the head 62 and in turn causes the head 62 to rotationally oscillate about an axis that passes through the pivot peg 80. The rotational axis of the head 62 is therefore generally perpendicular to the rotational axis of the shaft 65. It is preferred that the dimensions of the paddle 84 and gaps 78a, 78b is selected, such that the angle of rotation of the head 62 during operation is at least 45 degrees.

In order to remove the head 62 from the stem of the assembly, the button 72 is slid to retract the shaft 65. When the shaft 65 is retracted, the paddle 84 no longer impedes rotation of the head 62. Therefore, the button 72 must be held down by a user while the head 62 is simultaneously rotated in a counter-clockwise direction. During rotation, the tabs 81a, 81b slide within the grooves 77a, 77b. When the tabs 81a, 81b are aligned with the gaps 78a, 78b, the head 62 may be lifted out of the receptacle 75. The requirement that the button be held down during counter-clockwise rotation of the head provides an added security feature to the assembly. By requiring the use of both hands for removal of the brush portion of the assembly, unintentional separation of the brush portion from the stem portion is avoided; thereby, preventing a potential choking hazard for both children and adults during operation of the electric toothbrush.

The replacement head assembly according to various embodiments of the invention may also include an indicator for informing the user as to whether the head is adequately attached to the stem of the assembly. This may prevent potential injury, if the head were to become loose during the act of brushing. In one embodiment, the indicator may be in the form of a lighting system that uses power from the electric toothbrush to provide forward voltage (VF) to a diode disposed on the brush head or in between bristles. The illuminated bristles may also improve the aesthetic appearance of the toothbrush assembly. In another embodiment of the present invention, the indicator may be provided in the form of a mechanical toggle that may be engaged to confirm that the replacement head assembly is correctly attached to the stem.

By providing a replacement head assembly for an electric toothbrush, it is only necessary to discard the head portion having the bristles. This provides several benefits, such as reduced waste and cost, allowing the bristles to be discarded more frequently and improving dental hygiene. The head portions of the assembly may also be provided with a variety of bristle configurations to vary the bristle pattern and degree of stiffness. For example, the bristles may be configured to have a soft, medium, or hard stiffness, depending on the combination of bristle thickness and location about the main body of the head. The material used for the bristles may also be varied depending on the desired degree of stiffness. Examples of materials that may be used to manufacture the bristles include, but are not limited to, nylon, silk, and silicon. This would allow a user to temporarily switch to a softer brush, if the user was experiencing sensitive gums, for example. The bristles may be disposed on a face of the head 21a, 21b, 21c, 21d in the shape of a circle, as illustrated in FIGS. 2A to 2D, or any other pattern.

Figure 3:
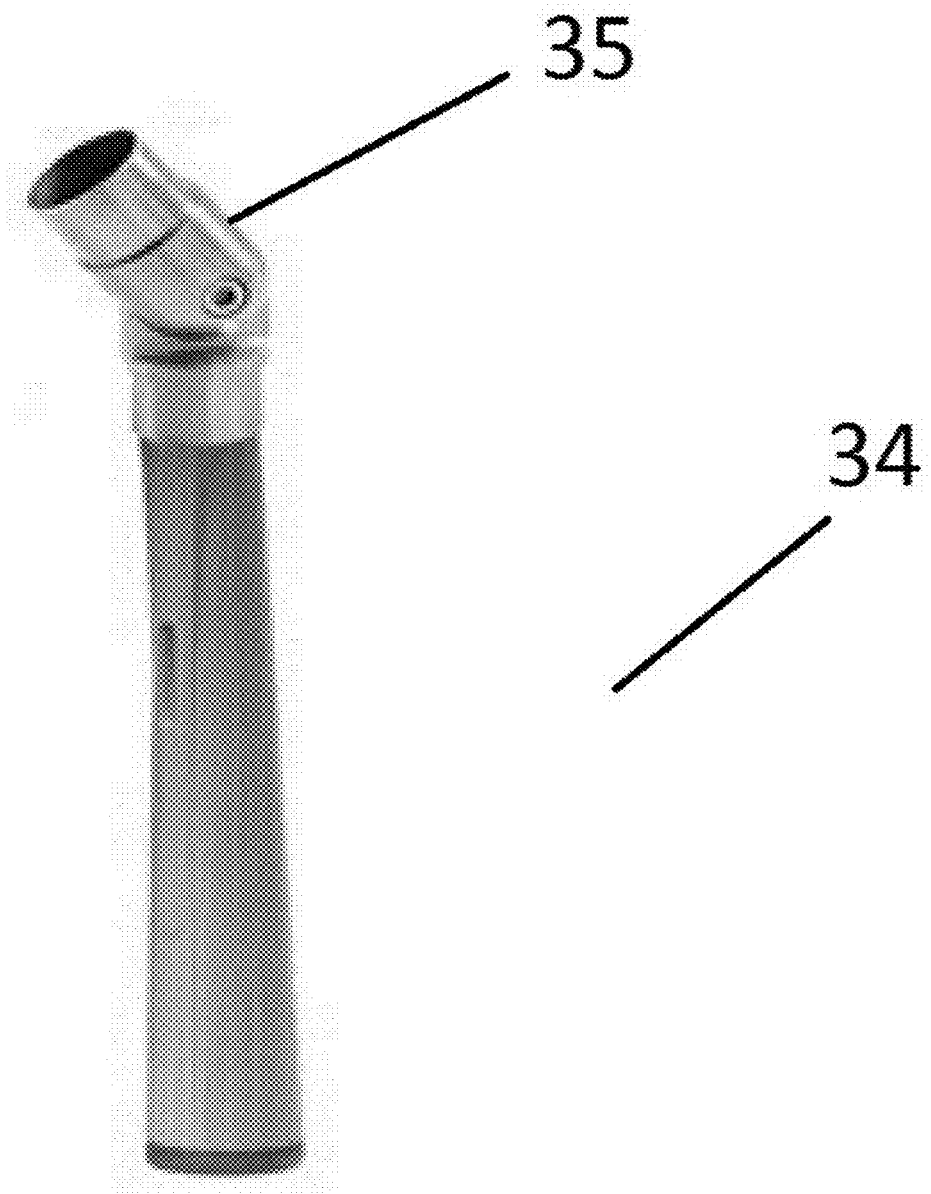
FIG. 3 is a front elevational view of a stem for an assembly according to a second embodiment of the present invention.

In some embodiments of the present invention, the tilt of the bristles may also be varied. For example, the head containing the bristles could be attached to a pivotable mount 35 of a stem 34 that would allow a user to adjust the tilt of the head at various angles relative to the stem 34, as illustrated in FIG. 3. This would allow a user to brush in certain areas within the mouth that may otherwise prove difficult to clean if the head was fixed at a certain angle relative to the stem.

The bristles according to various embodiments of the invention may also be optionally coated with a flavoring, such as mint. The bristles may also be optionally configured to allow a toothpaste or gel to flow along the length of the bristles from a source embedded in the main body of the head portion of the assembly. The toothpaste or gel may be stored in a reservoir within the main body that may be pierced upon attaching the head to the stem. Once the head is in the locked position, the toothpaste or gel may be released and allowed to flow by capillary action, for example, along the length of the bristles. The gel may optionally include hydrogen peroxide to assist with teeth whitening that may be achieved by exposing the teeth to UV light following brushing with the gel.

The head and stem of the assemblies according to the present invention may be made from any material known by those of skill in the art that are used in the fabrication of replacement brush heads for toothbrushes. The materials used are preferably selected from plastic and/or metals that are safe for use for oral hygiene applications and may also deter the growth of bacteria. Examples of materials that may be incorporated in the components of the assemblies according to the various embodiments of the present invention include, but are not limited to, titanium, zirconia, gold, and carbon. Antibacterial/antimicrobial compounds may also be incorporated into the materials.

The stem of the replacement head assembly may include a mounting end opposite the end on which the mating portion is located. The mounting end may include a female or male portion similar to those known by those skilled in the art. For example, the mounting end may be similar to the design provided for the existing one-piece replacement heads for systems manufactured by Oral-B, Philips, or Panasonic, for example. Alternatively, the replacement head assembly may be mounted onto a handle having a receptacle configured to receive the mating portion to provide a manual toothbrush. The stem may also optionally be provided with a tongue scraper, which is preferably located on an opposing side of the stem relative to the location of the head.

It is another aspect of the present invention to provide a method of ordering, purchasing, and/or delivering a replacement head assembly. The method would include providing a user with the ability to provide their current electric toothbrush brand (or select the option of combining the head assembly with a handle for a manual toothbrush) and to select the type of head, bristle stiffness, and/or frequency of delivery. This is preferably an internet based method, which would allow for the entry of payment and shipping information and coordination of delivery to the user. The purchases may be one time or based on a subscription over a specified time interval, such as monthly or annually.

While particular embodiments of the present invention have been illustrated and described, it would be obvious to those skilled in the art that various other changes and modifications can be made without departing from the spirit and scope of the invention.

I claim:

1. A replacement toothbrush head assembly comprising:
a head including a plurality of bristles extending from a main body comprising a coupling portion having a recess; and
a stem housing a slidable shaft and comprising a receptacle configured to receive the coupling portion, the receptacle comprising a pivot peg and the recess being configured to mate with the pivot peg such that the head is rotatable about the pivot peg in the assembled condition,
wherein sliding the shaft towards the head causes a tip of the shaft to interfere with the coupling portion, thereby preventing decoupling of the head from the stem and sliding the shaft away from the head allows decoupling of the head from the stem.

2. The replacement toothbrush head assembly of claim 1, wherein the coupling portion comprises a circumferential groove about the main body of the head and the receptacle includes a tab that extends into the circumferential groove in the assembled condition.

3. The replacement toothbrush head assembly of claim 2, wherein the coupling portion comprises a plurality of circumferential grooves about the main body.

4. The replacement toothbrush head assembly of claim 2, wherein the tip of the shaft comprises a paddle portion, the paddle portion being configured to rotatably actuate the head about a rotational axis within the receptacle in the assembled condition when the shaft oscillates about a longitudinal axis.

5. The replacement toothbrush head assembly of claim 4, wherein the rotational axis is perpendicular to the longitudinal axis.

6. The replacement toothbrush head assembly of claim 4, wherein the stem houses a spring arranged to bear against the shaft and the shaft is biased towards the receptacle when the spring is in a relaxed condition.

7. The replacement toothbrush head assembly of claim 6, wherein the shaft prevents decoupling of the head from the stem when the spring is in the relaxed condition.

8. The replacement toothbrush head assembly of claim 7, wherein the spring is a coil spring and the shaft extends through the coil spring.

9. The replacement toothbrush head assembly of claim 6 further comprising a button on an outer surface of the shaft configured to slide the shaft within the stem against the spring.

10. The replacement toothbrush head assembly of claim 1, wherein the shaft is configured to slide within the stem towards the receptacle to an extended position and away from the receptacle to a retracted position.

11. The replacement toothbrush head assembly of claim 10, wherein the shaft prevents decoupling of the head from the stem in the extended position.

12. The replacement toothbrush head assembly of claim 10 further comprising a button on an outer surface of the shaft configured to slide the shaft within the stem between the extended and retracted position.

13. The replacement toothbrush head assembly of claim 1, wherein the tip of the shaft comprises a paddle portion, the paddle portion being configured to rotatably actuate the head about a rotational axis in the assembled condition when the shaft oscillates about a longitudinal axis.

14. The replacement toothbrush head assembly of claim 13, wherein the rotational axis is perpendicular to the longitudinal axis.

* * * * *